United States Patent [19]
Edde et al.

[11] Patent Number: 5,852,406
[45] Date of Patent: *Dec. 22, 1998

[54] MULTI-PROTOCOL DATA BUS SYSTEM

[75] Inventors: Gabriel Alfred Edde, Indianapolis; Michael David Landis, Hamilton, both of Ind.

[73] Assignee: Thomson Consumer Electronics, Inc., Indianapolis, Ind.

[ * ] Notice: This patent issued on a continued prosecution application filed under 37 CFR 1.53(d), and is subject to the twenty year patent term provisions of 35 U.S.C. 154(a)(2).

[21] Appl. No.: 435,818

[22] Filed: May 5, 1995

[30] Foreign Application Priority Data

Jul. 15, 1994 [GB] United Kingdom ............... 9414331

[51] Int. Cl.$^6$ .......................................... A04Q 1/00
[52] U.S. Cl. .................. 340/825.06; 340/825.03; 340/825.5; 370/438
[58] Field of Search .............. 340/825.06, 825.03, 340/825.08, 825.5, 825.52, 825.14, 825.21; 370/85.1, 85.11, 85.7, 95.1, 438; 395/284, 305

[56] References Cited

U.S. PATENT DOCUMENTS

| | | | |
|---|---|---|---|
| 4,296,403 | 10/1981 | Haensel ........................... | 340/147 P |
| 4,574,377 | 3/1986 | Miyazaki et al. .................. | 370/95.3 |
| 4,792,950 | 12/1988 | Volk et al. ........................ | 371/8.2 |
| 4,827,471 | 5/1989 | Geiger et al. ..................... | 340/825.5 |
| 4,868,812 | 9/1989 | Kruger et al. .................... | 370/56 |
| 4,910,509 | 3/1990 | Rabii ............................... | 340/33.1 |
| 5,146,453 | 9/1992 | Nagler et al. ..................... | 370/58.1 |
| 5,355,391 | 10/1994 | Horowitz et al. ................ | 375/36 |
| 5,376,928 | 12/1994 | Testin .............................. | 340/825.5 |
| 5,452,330 | 9/1995 | Goldstein ........................ | 375/257 |

FOREIGN PATENT DOCUMENTS

| | | | |
|---|---|---|---|
| 0258872 | 3/1988 | European Pat. Off. ......... | G06F 13/42 |
| 0288713 | 11/1988 | European Pat. Off. ......... | G06F 13/12 |
| 0504086A1 | 9/1992 | European Pat. Off. . | |
| 588191A1 | 3/1994 | European Pat. Off. . | |
| 0598510A2 | 5/1994 | European Pat. Off. . | |
| WO85/03147 | 7/1985 | WIPO ............................ | G06F 3/04 |

OTHER PUBLICATIONS

Philips, "I2C Bus In Consumer Applications" pp. 1–8 (1983) month unknown.

Intermetall Semiconductors ITT, "Digit 2000 VLSI Digital TV System" p. 17 (1983) month unknown.

*Primary Examiner*—Michael Horabik
*Assistant Examiner*—Yonel Beaulieu
*Attorney, Agent, or Firm*—Joseph S. Tripoli; Peter M. Emanuel; David T. Shoneman

[57] ABSTRACT

A multi-protocol serial data bus system includes two clock lines and a data line. A controller generates a first clock signal and a first data signal according to a first serial data bus protocol during a first mode of operation of the system, and generates a second clock signal and a second data signal according to a second serial data bus protocol during a second mode of operation. The first clock signal and the first data signal are provided on the first and third signal paths, respectively, during the first mode of operation. The second clock signal and the second data signal are provided on the second and third signal paths, respectively, during the second mode of operation.

20 Claims, 5 Drawing Sheets

MULTI-PROTOCOL DATA BUS SYSTEM

FIELD OF THE INVENTION

The present invention involves signal processing systems controlled via a data bus such as a serial data bus.

BACKGROUND

Signal processing systems such as those in consumer electronics devices typically include digital integrated circuits (ICs) that implement various functions. For example, in a television receiver, ICs provide signal processing functions including tuning, video processing, and audio processing. In addition, a microcomputer ($\mu$C) IC controls the operation of the other ICs by writing data, such as control parameters, to the ICs and reading data, such as status data, from the ICs.

Information is communicated between the ICs and the control $\mu$C via a data bus such as a serial data bus. Two examples of bus protocols in use are the Inter IC (IIC or I$^2$C) bus protocol and the Intermetall (IM) bus protocol supported by Philips and ITT, respectively. Each bus protocol requires certain bus signals exhibiting particular timing relationships. The signals and timing differ for each protocol. For example, the IIC bus requires clock and data signals designated "SCL" and "SDA", respectively, while the IM bus requires clock, data and enable signals designated "CLOCK", "DATA" and "IDENT", respectively.

The ICs selected for a signal processing system may require more than one bus protocol. For example, a television system such as the CTC-169 color television chassis, manufactured by Thomson Conusmer Electronics, Inc., Indianapolis, Ind., includes certain ICs that are controlled via an IIC bus interface while other ICs require an IM bus interface. As a result, the control $\mu$C must provide control signals for each protocol. One approach is to provide serial bus terminals on the $\mu$C for each protocol. This approach requires five serial bus terminals to provide the five signals needed for both the IIC and IM protocols. However, ICs such as a control $\mu$C typically have a limited number of terminals that can be used for additional serial bus signals. In addition, adding serial I/O capability requires adding interface circuitry that may be difficult or impossible to incorporate into the IC design.

Another approach is to use the same bus lines and control $\mu$C terminals for all protocols. For example, if three terminals of the control $\mu$C are used to provide IM-format signals when controlling an IM-type IC, two of the same three terminals and signal paths are used during IIC communications to provide the IIC-format signals. Such a system is disclosed in U.S. Pat. No. 5,376,928 issued on Dec. 27, 1994 to William J. Testin, commonly assigned with the present application and incorporated herein by reference. As explained in U.S. Pat. No. 5,376,928, using one set of signal paths to provide signals for multiple protocols may result in bus conflicts and improper control of the ICs connected to the bus. Briefly, an integrated circuit (IC) dedicated to one protocol may misinterpret signals formatted under a different protocol. For example, the IIC bus standard specifies that a falling transition (logic 1 to logic 0) occurring on a data signal when a clock signal exhibits an inactive state (constant logic 1) indicates a "message start" condition. After a "message start" condition, IIC devices may respond to subsequent data on the bus. Signal waveforms that provide an IM bus format communication may inadvertently create the "message start" condition of the IIC protocol. As a result, an IIC device may respond to an IM format message causing two devices to communicate simultaneously on the bus. Corruption of any transmission that is in progress and incorrect system operation may result.

The system disclosed in U.S. Pat. No. 5,376,928 addresses the bus conflict problem by interchanging the function of the bus lines providing data and clock signals when a change of protocol is required. More specifically, Testin discloses one bus line that provides an IIC clock signal (signal SCL) during IIC operations and provides an IM data signal (signal DATA) during IM operations. Another bus line provides an IIC data signal (signal SDA) during IIC operations and provides an IM clock signal (signal CLOCK) during IM operations. A third bus line provides the ENABLE signal for IM bus operations.

The approach disclosed in U.S. Pat. No. 5,376,928 requires switches and switch control signals for changing the function of two bus lines. One switch couples signal SCL to a first bus line during IIC operations and couples signal DATA to the first bus line during IM operations. Another switch couples signal SDA to a second bus line during IIC operations and couples signal CLOCK to the second bus line during IM operations. Control signals must be generated to control each switch. Implementing switching features may require additional circuitry that involves undesirable added cost and/or complexity. For example, adding circuitry to an "off the shelf" control $\mu$C IC may be very costly.

SUMMARY OF THE INVENTION

The present invention resides, in part, in recognizing the described problems and, in part, in providing a multi-protocol data bus system that solves the problems. In accordance with an aspect of the invention, a system comprises a data bus including first, second and third signal paths, and a controller for generating clock and data signals according to first and second data bus protocols during respective first and second modes of operation of the system and for providing the clock and data signals on the first and third signal paths, respectively, during the first mode of operation, and on the second and third signal paths, respectively, during the second mode of operation.

BRIEF DESCRIPTION OF THE DRAWING

The invention may be better understood by referring to the enclosed drawing in which.

DETAILED DESCRIPTION

Figure 1:
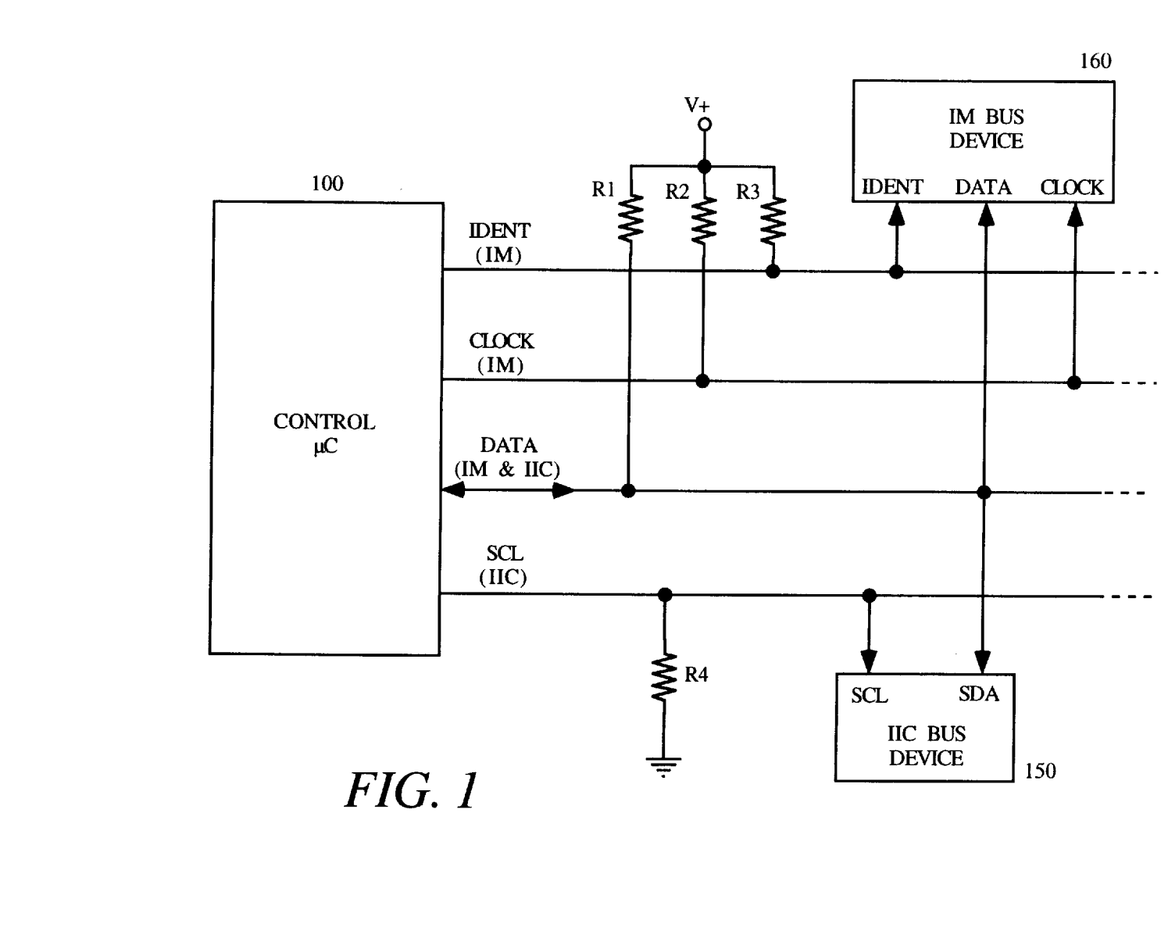
FIG. 1 shows, in block diagram form, a system including an embodiment of the invention.

FIG. 1 shows an exemplary signal processing system, such as the CTC-169 color television chassis mentioned above, including control microcomputer ($\mu$C or controller) 100 coupled to devices 150 and 160 via signal paths labeled IDENT, CLOCK, DATA and SCL. Controller 100 may be an integrated circuit (IC) micro-controller such as the Motorola MC68HC05. Device 150 represents one or more devices that are controlled in response to IIC format signals generated by controller 100. Examples of device 150 are ICs such as a Microchip 24C02 EEPROM, a Motorola MC44802 tuning processor and a Philips 8444 digital-to-analog converter (DAC). Device 160 represents one or more devices controlled in response to IM format signals generated by controller 100. Examples of device 160 are ICs such as the Thomson 1A68109 Proscan® processor, Thomson 1A68106 stereo audio processor and a Thomson 1A68105 picture-in-picture (PIP) processor.

In accordance with principles of the present invention, the signal paths IDENT, CLOCK, DATA and SCL shown in FIG. 1 provide a multi-protocol serial data bus that permits controller 100 to control devices that respond to signals formatted according to either the IIC or IM serial data bus protocols. For IIC bus communications, controller 100 generates a clock signal and a data signal according to the IIC bus protocol on signal paths SCL and DATA, respectively. For IM bus communications, controller 100 generates a clock signal and a data signal according to the IM bus protocol on signal paths CLOCK and DATA, respectively, and generates an enable signal IDENT on the signal path of the same name.

Figure 2:
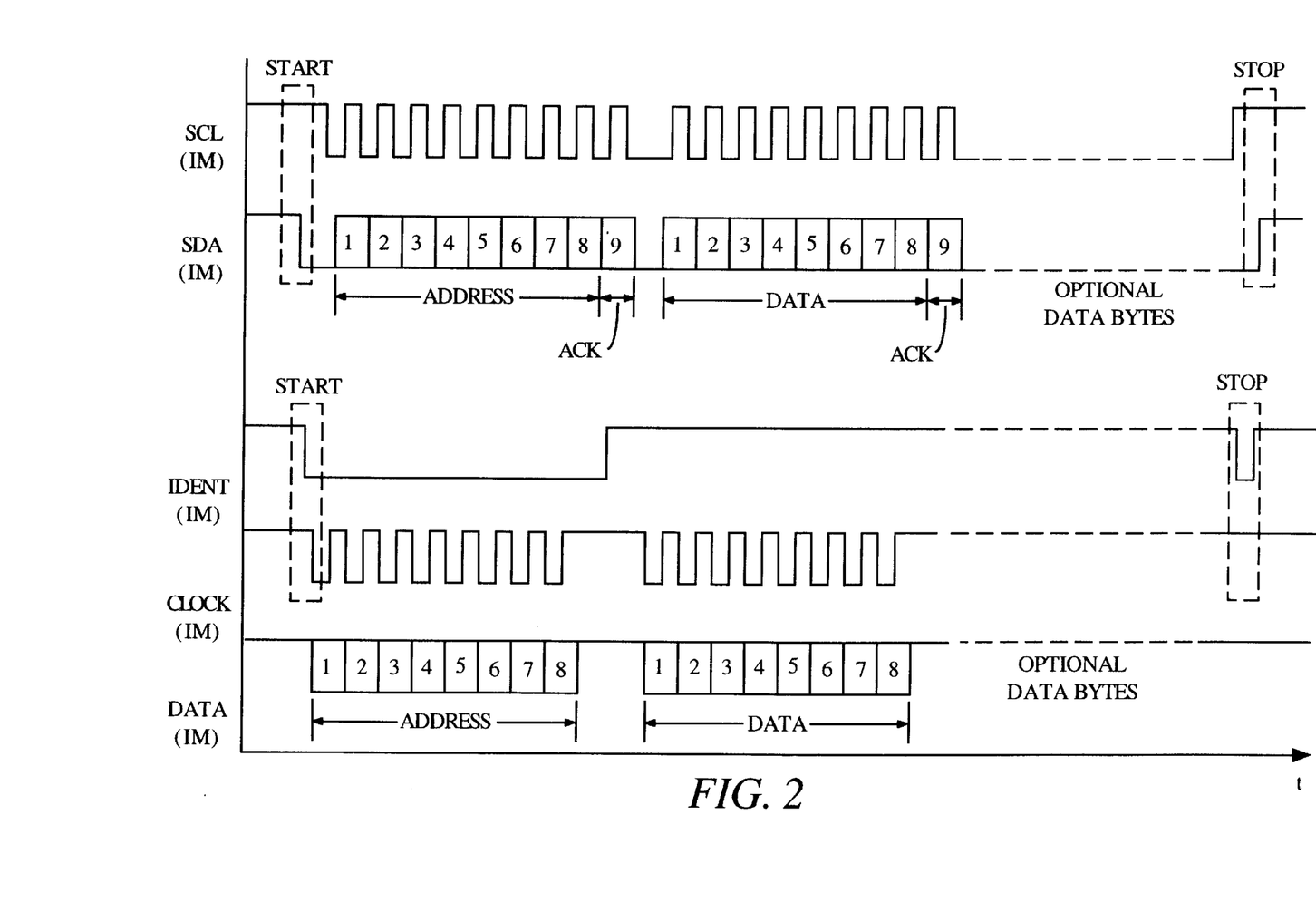
FIG. 2 shows waveforms illustrating two serial data bus protocols.

The present invention may be better understood by referring to FIG. 2 which shows signal waveforms illustrating certain timing relationships of the signals that are required by each protocol. Specific timing requirements for IIC and IM bus communication are well known to those skilled in the art and are not described in detail here. The top portion of FIG. 2 shows timing relationships for IIC protocol communications. In particular, message "start" and "stop" conditions occur when a transition occurs on signal SDA (the data signal) while signal SCL (the clock signal) is idle (no communication in progress) at logic 1. Between message start and stop conditions, each clock pulse on signal SCL indicates occurrence of a bit of data on signal SDA. The receiving device uses the clock pulses to store the bits of data in a register. Eight bits, i.e., one byte, of address information begin each transmission to indicate the device to which the communication is directed. The address is followed by one or more bytes of data. Each byte of address or data is followed by an acknowledge bit ("ACK") that provides "handshaking" between the receiving device and the controller to ensure that the preceding byte was received.

The bottom portion of FIG. 2 shows the timing for IM protocol communications. An IM message start condition occurs at the first falling transition of signal CLOCK after signal IDENT changes from logic 1 to logic 0. After a start condition occurs, signal IDENT remains at logic 0 until one byte of address information has been transmitted. Then, signal IDENT returns to and remains at logic 1 while one or more bytes of data are transmitted. A pulse on signal IDENT while signal CLOCK is idle (at logic 1) indicates a message stop condition. As in the case of IIC communications, each pulse of signal clock between message start and stop conditions indicates a bit of valid address or data is present on the data signal path.

Figure 3:
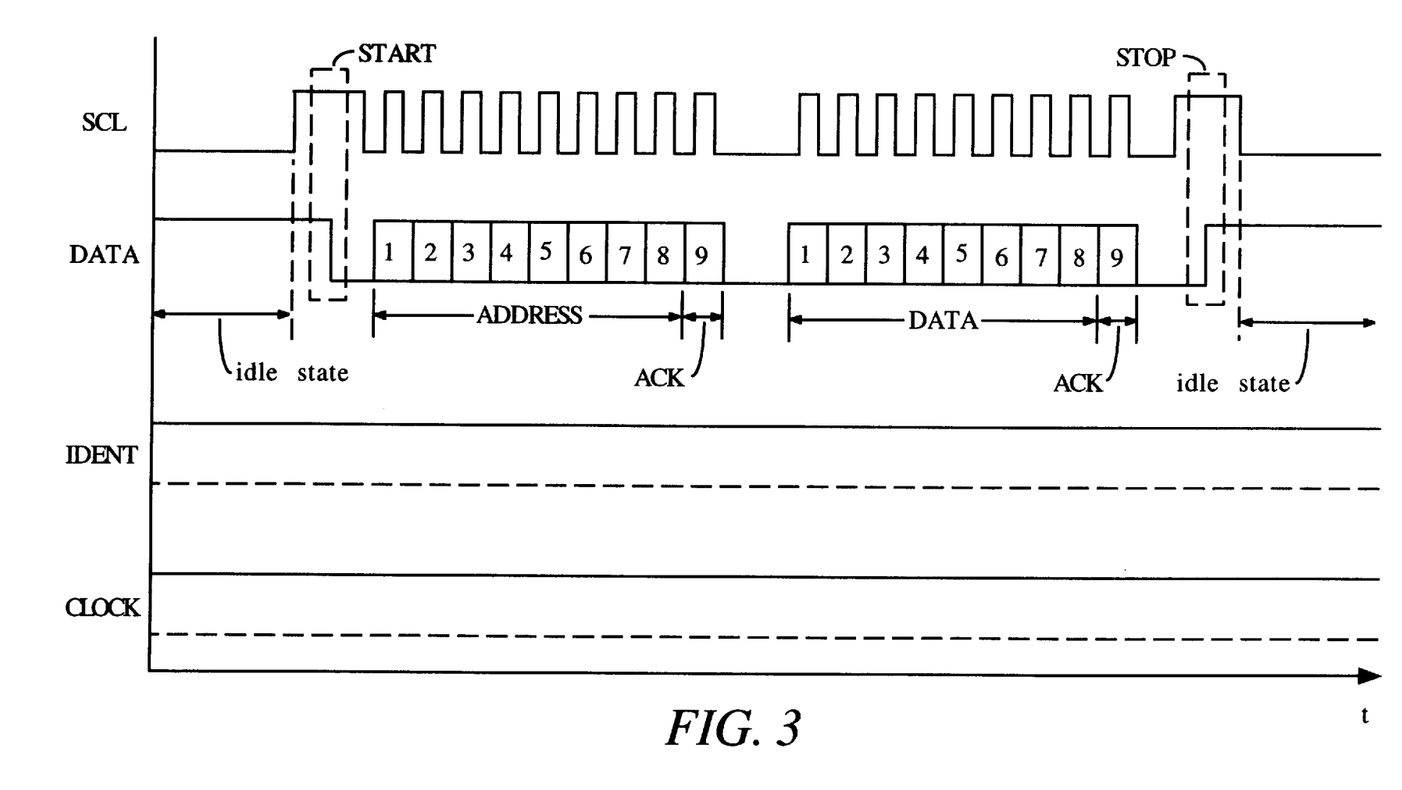
FIGS. 3 and 4 show waveforms illustrating operating modes of the system shown in FIG. 1.
Figure 4:
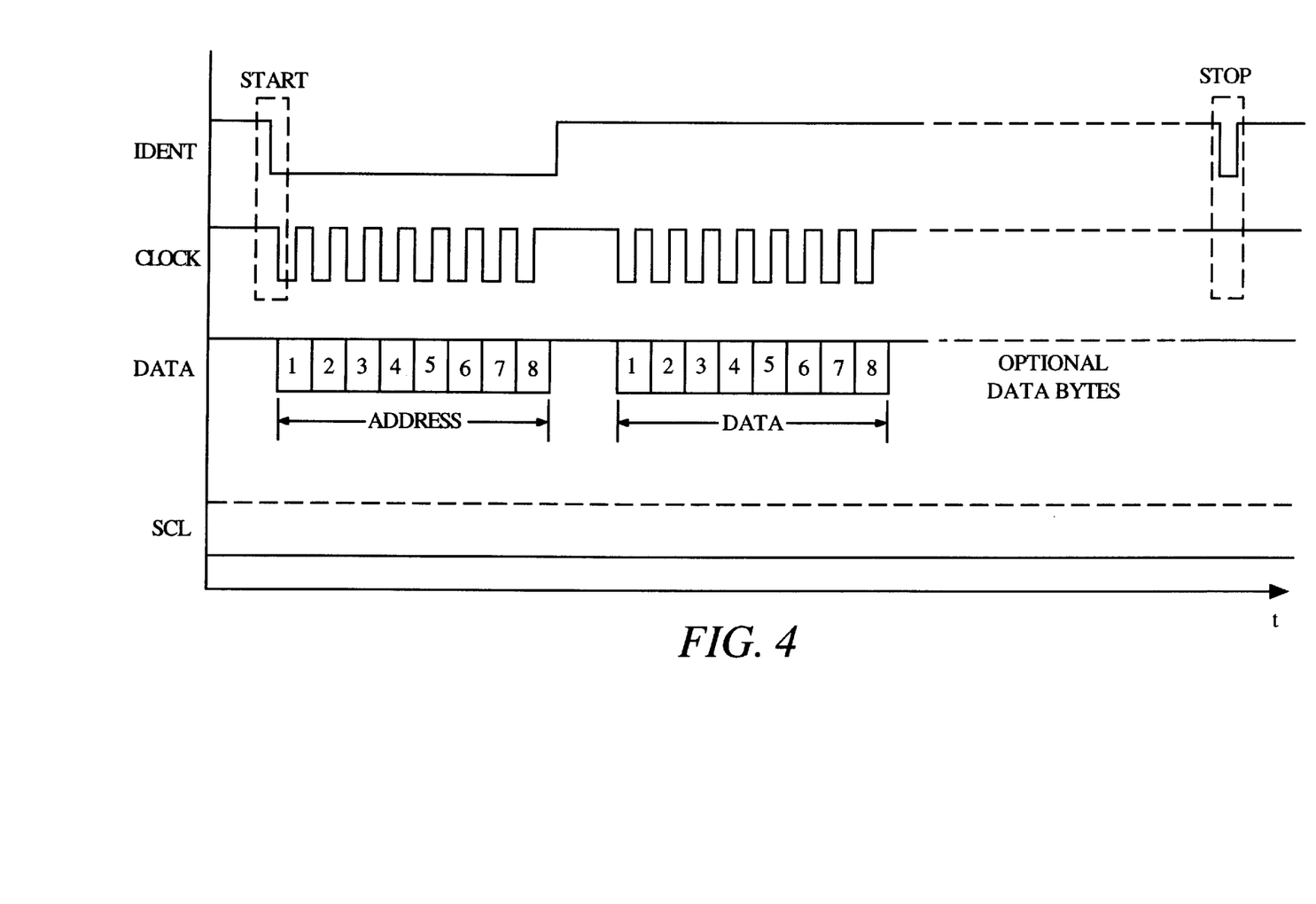

Waveforms in FIGS. 3 and 4 illustrate signals generated by controller 100 in FIG. 1 that provide both IIC and IM bus communications using the four signal paths shown in FIG. 1. FIG. 3 illustrates a first mode of operation of the system of FIG. 1 during which controller 100 communicates with IIC-type devices by producing IIC-format clock and data signals on signal paths SCL and DATA, respectively, in FIG. 1. Signal paths SCL and DATA are coupled to the SCL and SDA signal terminals, respectively, of IIC-type devices. As shown in FIG. 3, the timing relationship between signals SCL and DATA generated by controller 100 during an IIC communication provides start, address, data and stop conditions as required by the IIC protocol illustrated in FIG. 2.

FIG. 4 illustrates a second mode of operation of the system of FIG. 1 during which controller 100 communicates with IM-type devices by providing IM-format enable, clock and data signals on signal paths IDENT, CLOCK and DATA, respectively, in FIG. 1. These signals are coupled to correspondingly named terminals of IM-type devices. As can be seen in FIG. 4, the timing relationship between signals IDENT, CLOCK and DATA generated by controller 100 during an IM communication provides the start, address, data and stop conditions that are required by the IM protocol illustrated in FIG. 4.

For either protocol, controller 100 generates the address and data on signal DATA under by executing a software routine that implements a procedure known as "bit-banging". Bit-banging involves using software to manipulate the contents of a particular bit of an internal register of $\mu C$ 100, e.g., the accumulator register. For example, the software may include instructions that perform logical operations on the data stored in the register. Each execution of the bit-bang software routine modifies the value stored in the register bit in a manner that produces one bit of the required serial bit pattern. Signal path DATA is coupled to the particular register bit via a bi-directional input-output (I/O) terminal of controller 100. The I/O terminal is "memory mapped", i.e., assigned an address in memory space, so that the "coupling" of the register bit to the I/O terminal is accomplished by "writing" the content of the register bit to the I/O terminal. A different sequence of software instructions is executed for each protocol because, for example, the software must produce 8 bits of data on signal DATA for each "word" of information in an IM transmission while 8 bits of data and an acknowledge bit, i.e., 9 bits of information, are required for each IIC word.

In addition to the signals generated by controller 100 under software control for each protocol, the system in FIG. 1 also includes a bias circuit comprising resistors R1 through R4 for establishing a predetermined signal level, e.g., one of two binary signal levels, on signal paths that are not being used. For example, during an IIC-format communication, signals IDENT and CLOCK are not used and are set to logic 1 (approximately the supply voltage V+) by bias (or pullup) resistors R2 and R3. To facilitate setting signals IDENT and CLOCK to logic 1, the output circuit within controller 100 that is coupled to signals IDENT and CLOCK may be implemented, for example, using a tri-state design that provides a high-impedance condition on signal paths IDENT and CLOCK during IIC communications.

Similarly, during an IM-format communication, signal SCL is unused and is maintained at a level of logic 0 (i.e., approximately ground) by resistor R4. As in the case of the output circuits of controller 100 for signals IDENT and CLOCK, the output circuit for signal SCL may be a tri-state design that provides a high-impedance condition on signal path SCL during IM communications.

The bias circuit also operates to establish predetermined signal levels on all four bus signal paths during an idle state, i.e., when no bus communications are in progress. Idle states before and after an IIC communication are illustrated in FIG. 3. During an idle state, resistors R1–R3 set signals IDENT, CLOCK and DATA to logic 1 while resistor R4 sets signal SCL to logic 0. Because the IIC protocol requires signal SCL to be at logic 1 for IIC start and stop conditions to occur (see FIG. 2), controller 100 sets signal SCL to logic 1 before and after an IIC communication as shown in FIG. 3.

By providing a multi-bus protocol system using only one data line (signal DATA), the system shown in FIG. 1 reduces the number of bus lines from five to four for a combined IIC and IM bus protocol system. Thus, the system reduces the number of terminals of controller 100 that are required for serial I/O and reduces the number of bus lines that must be wired throughout the system. In addition, because the function of signal DATA does not change, switching and control circuitry required for coupling different signal sources to signal line DATA are not necessary. Also, generating signal DATA under software control in all cases minimizes the amount of hardware required to implement the serial data bus interface.

While combining data signals for both protocols into one signal path reduces the number of bus lines, separate signal paths for each clock signal make it possible to establish signal levels on unused clock lines that will prevent false start conditions and false stop conditions. False start conditions and false stop conditions can cause corrupted data and incorrect system operation. For example, an EEPROM may be configured to execute a write operation, i.e., modify EEPROM data, when the EEPROM receives a certain sequence of data followed by a stop condition. Thus, a false stop condition can unintentionally modify EEPROM data and adversely affect system operation. The system shown in FIG. 1 prevents false start conditions and false stop conditions for IIC devices by setting signal SCL to logic 0 when idle. As can be seen in FIGS. 2 and 3, signal SCL must be at logic 1 for a start or stop condition to occur. Similarly, setting signal CLOCK to logic 1 when unused prevents false start conditions and false stop conditions for IM devices as is evident from FIGS. 2 and 4. As a result, separate clock lines improve system reliability.

Figure 5:
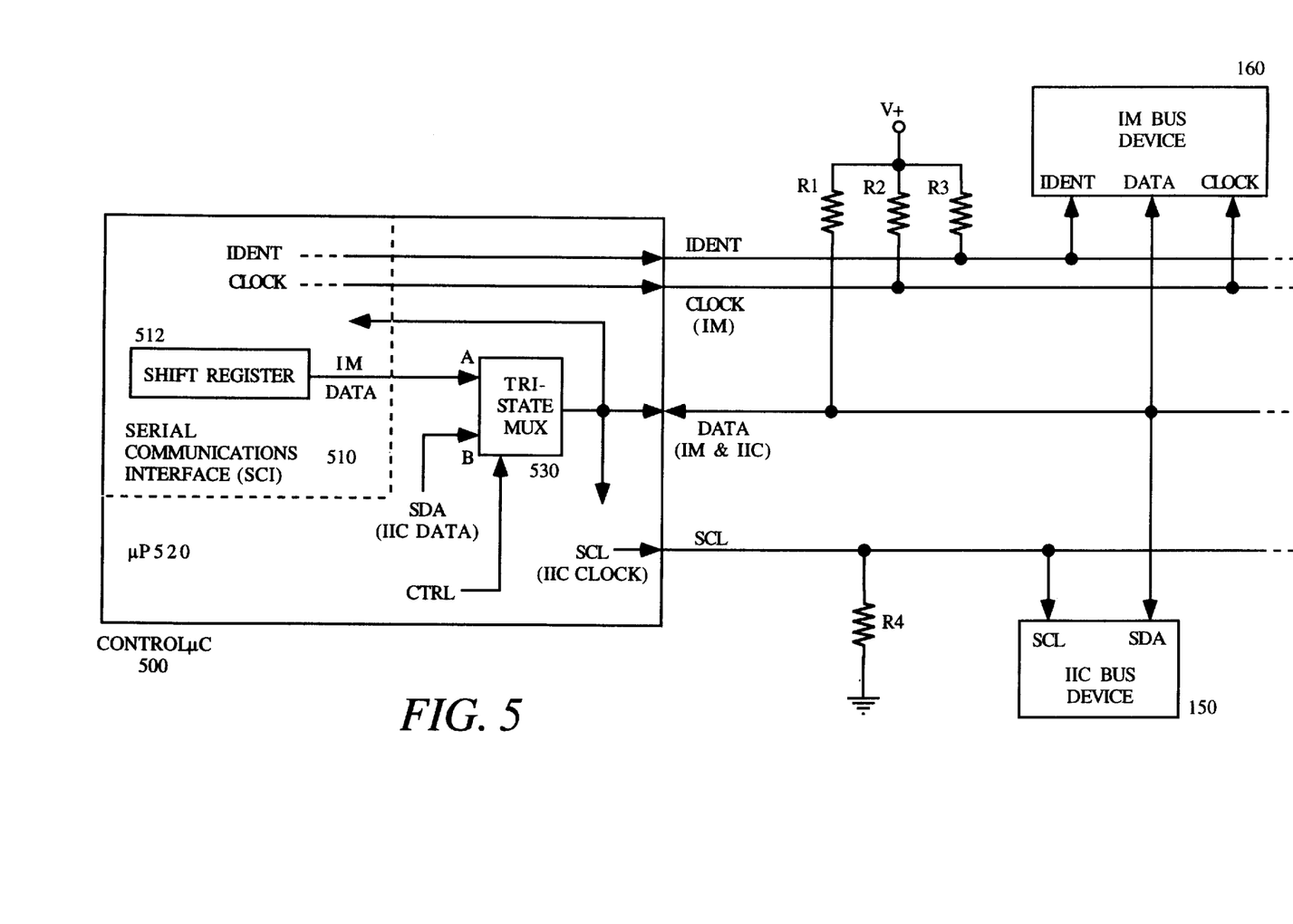
FIG. 5 shows, in block diagram form, another embodiment of the system shown in FIG. 1.

Although the system shown in FIG. 1 avoids additional hardware for switching the function of bus lines and generating data, the invention is applicable to systems that include such features. For example, FIG. 5 shows a system including serial data bus signal paths that are the same as in FIG. 1. However, a controller 500 in FIG. 5 includes serial communications interface (SCI) 510, microprocessor 520 and tri-state multiplexer (MUX) 530. Hardware within SCI 510 generates signals for IM protocol communications. For example, gating circuits within SCI 510 generate signals IDENT and CLOCK, and signal IM DATA is generated directly at an output of shift register 512 in response to data shifted through shift register 512.

Signals for IIC communications are generated under software control by microprocessor 520 using bit-bang procedures as described above. Bit-bang processing is used rather than hardware such as shift register 512 because the IIC protocol requires 9 bits of information for each word (8 data bits and an acknowledge bit). If shift register 520 is an 8-bit shift register, generating 9 bits of data requires additional loading of the shift register that is undesirable. Signals for IIC communications could be generated by hardware if appropriate shift register hardware is available.

Also in FIG. 5, MUX 530 functions as a switch for coupling signal IM DATA from SCI 510 to signal path DATA during IM communications and for coupling signal SDA (IIC data) to signal path DATA for IIC communications. The switching function of MUX 530 is controlled by signal CTRL that is generated by microprocessor 520. A tri-state output feature of MUX 530 provides a high impedance state at the output of MUX 530 when the bi-directional terminal coupled to signal DATA operates as an input. Thus, the system in FIG. 5 retains the bus signal structure of FIG. 1 while utilizing additional hardware features to generate the bus signals.

Various modifications of the described embodiments will be apparent to one skilled in the art. For example, although the invention has been described in the context of television signal processing systems, the invention is applicable to any bus controlled system that involves multiple bus protocols. In addition, the invention is applicable to bus protocols other than the exemplary IIC and IM protocols that are discussed above. These and other modifications are intended to be within the scope of the following claims.

We claim:

1. A system comprising:

a data bus comprising first, second and third signal paths; and control means for generating a first clock signal and a first data signal according to a first data bus protocol during a first mode of operation of said system, and for generating a second clock signal and a second data signal according to a second data bus protocol during a second mode of operation;

said control means providing said first clock signal and said first data signal on said first and third signal paths, respectively, in accordance with said first data bus protocol during said first mode of operation, and providing said second clock signal and said second data signal on said second and third signal paths, respectively, in accordance with said second data bus protocol during said second mode of operation.

2. The system of claim 1 further comprising bias means for maintaining a predetermined signal level on said first signal path during said second mode of operation.

3. The system of claim 2 wherein said first and second clock signals and said first and second data signals being binary signals exhibiting at least one of two binary states;

said first clock signal on said first signal path exhibiting a first one of said two binary states during a transition of said first data signal on said third signal path between said two binary states for indicating a condition of a communication via said data bus during said first mode of operation; and said predetermined signal level established by said bias means on said first signal path during said second mode of operation being representative of a second one of said two binary states.

4. The system of claim 3 wherein, said control means comprising a microprocessor having an output coupled to said third signal path and operating under software control during said first and second modes of operation for generating said first and second data signals at said output of said microprocessor.

5. The system of claim 4, wherein said data bus being a serial data bus;

said first data bus protocol comprising an IIC serial data bus protocol; and said second data bus protocol comprising an IM serial data bus protocol.

6. The system of claim 5, wherein said data bus further comprising a fourth signal path; and said control means generating an enable signal according to said second data bus protocol and providing said enable signal on said fourth signal path during said second mode of operation.

7. A system comprising:

a data bus comprising first, second and third signal paths;

a first device coupled to said first and third signal paths;

a second device coupled to said second and third signal paths;

control means for generating a first clock signal and a first data signal according to a first data bus protocol during a first mode of operation of said system, for generating a second clock signal and a second data signal according to a second data bus protocol during a second mode of operation, and for generating a control signal indicating whether said system is in said first or said second mode of operation; and switch means responsive to said control signal for coupling said first data signal to said third signal path during said first mode of operation and for coupling said second data signal to said third signal path during said second mode of operation;

said control means providing said first clock signal on said first signal path in accordance with said first data bus protocol for controlling said first device during said first mode of operation, and providing said second clock signal on said second signal path in accordance with said second data bus protocol for controlling said second device during said second mode of operation.

8. The system of claim 7 further comprising bias means for establishing a predetermined signal level on said first signal path during said second mode of operation.

9. The system of claim 8 wherein said first and second clock signals and said first and second data signals being binary signals exhibiting at least one of two binary states;

said first clock signal exhibiting a first one of said two binary states during a transition of said first data signal between said two binary states for indicating a condition of a communication via said data bus during said first mode of operation; and said predetermined signal level established by said bias means on said first signal path during said second mode of operation being representative of a second one of said two binary states.

10. The system of claim 9, wherein said control means further comprises:

a microprocessor operating under software control during said first mode of operation for generating said first data signal at an output of said microprocessor; and a shift register for generating said second data signal at an output of said shift register during said second mode of operation;

said switch means being responsive to said control signal for coupling said output of said microprocessor to said third signal path during said first mode of operation and for coupling said output of said shift register to said third signal path during said second mode of operation.

11. The system of claim 10, wherein said data bus being a serial data bus;

said first data bus protocol comprising an IIC serial data bus protocol; and said second data bus protocol comprising an IM serial data bus protocol.

12. The system of claim 11, wherein said data bus further comprising a fourth signal path; and said control means generating an enable signal according to said second data bus protocol and providing said enable signal on said fourth signal path during said second mode of operation.

13. A system comprising:

a serial data bus comprising first, second and third signal paths;

first means coupled only to said first and third signal paths for processing data in response to a first pair of signals exhibiting a first predetermined timing relationship in accordance with a first data bus protocol; said first pair of signals being received via said first and third signal paths;

second means coupled only to said second and third signal paths for processing data in response to a second pair of signals exhibiting a second predetermined timing relationship in accordance with a second data bus protocol; said second pair of signals being received via said second and third signal paths;

control means coupled to said data bus for generating a clock signal and a data signal during each of first and second modes of operation of said system, said clock signal and said data signal exhibiting said first predetermined timing relationship in accordance with said first data bus protocol during said first mode of operation and exhibiting said second predetermined timing relationship in accordance with said second data bus protocol during said second mode of operation; said control means providing said clock signal and said data signal to said first and third signal paths, respectively, for providing said first pair of signals for controlling only said first means during said first mode of operation, and providing said clock signal and said data signal to said second and third signal paths, respectively, for providing said second pair of signals for controlling only said second means during said second mode of operation; and bias means for establishing a predetermined signal level on one of said first and second signal paths during one of said first and second modes of operation.

14. The system of claim 13 wherein said clock signal and said data signal being binary signals exhibiting at least one of two binary states;

said clock signal on said first signal path exhibiting a first one of said two binary states during a transition of said data signal on said third signal path between said two binary states for indicating a condition of a communication via said serial data bus during said first mode of operation; and said predetermined signal level established by said bias means on said first signal path during said second mode of operation being representative of a second one of said two binary states.

15. The system of claim 14, wherein said control means comprises a microprocessor having an output coupled to said third signal path and operating under software control during said first and second modes of operation for generating said data signal at said output of said microprocessor.

16. The system of claim 15, wherein said first predetermined timing relationship is in accordance with an IIC serial data bus protocol and said second predetermined timing relationship is in accordance with an IM serial data bus protocol.

17. The system of claim 16, wherein said serial data bus further comprising a fourth signal path; and said control means generating an enable signal according to said second data bus protocol and providing said enable signal on said fourth signal path during said second mode of operation.

18. The system of claim 14, wherein said control means comprising:

a microprocessor for generating said data signal during said first mode of operation at an output of said microprocessor, and for generating a control signal indicating whether said system is in said first or said second mode of operation;

a shift register for generating said data signal during said second mode of operation at an output of said shift register; and a switch responsive to a control signal for coupling said data signal from said output of said microprocessor to said third signal path during said first mode of operation, and for coupling said data signal from said shift register to said third signal path during said second mode of operation.

19. The system of claim 18, wherein said first predetermined timing relationship is in accordance with an IIC serial data bus protocol and said second predetermined timing relationship is in accordance with an IM serial data bus protocol.

20. The system of claim 19, wherein said serial data bus further comprising a fourth signal path; and said control means generating an enable signal according to said second data bus protocol and providing said enable signal on said fourth signal path during said second mode of operation.

* * * * *